United States Patent [19]
Klipper et al.

[11] Patent Number: 5,464,875
[45] Date of Patent: Nov. 7, 1995

[54] PROCESS FOR PREPARING WEAKLY-BASIC ANION EXCHANGERS AND REAGENTS SUITABLE FOR THIS PURPOSE

[75] Inventors: Reinhold Klipper, Köln; Stefan Antons, Leverkusen; Guido Steffan; Alfred Mitschker, both of Odenthal; Werner Strüver, Leverkusen; Holger Lütjens, Köln, all of Germany

[73] Assignee: Bayer Aktiengesellschaft, Leverkusen, Germany

[21] Appl. No.: 289,812

[22] Filed: Aug. 12, 1994

[30] Foreign Application Priority Data

Aug. 20, 1993 [DE] Germany .................. 43 28 075.7

[51] Int. Cl.$^6$ ...................................................... C08F 8/32
[52] U.S. Cl. ................ 521/32; 525/333.6; 525/359.1; 525/359.2; 525/359.6; 525/375; 548/473
[58] Field of Search ............................... 548/473; 521/32; 525/333.6, 375

[56] References Cited

U.S. PATENT DOCUMENTS

| | | |
|---|---|---|
| 3,882,053 | 5/1975 | Corte et al. . |
| 4,478,984 | 10/1984 | Bryan . |
| 4,491,586 | 1/1985 | Hayes ................................. 424/267 |
| 4,952,608 | 8/1990 | Klipper et al. . |

FOREIGN PATENT DOCUMENTS

| | | |
|---|---|---|
| 0309861 | 4/1988 | European Pat. Off. . |
| 1415438 | 12/1964 | France . |
| 1054715 | 4/1959 | Germany . |

*Primary Examiner*—Fred Zitomer
*Attorney, Agent, or Firm*—Sprung Horn Kramer & Woods

[57] ABSTRACT

An improved aminomethylation process gives weakly-basic anion exchangers in an elegant way, with by-product obtained being able to be processed into a suitable starting material without problems.

2 Claims, No Drawings

PROCESS FOR PREPARING WEAKLY-BASIC ANION EXCHANGERS AND REAGENTS SUITABLE FOR THIS PURPOSE

The invention relates to a low-waste process for preparing weakly-basic anion exchangers based on crosslinked vinylaromatic polymers by the aminomethylation process and processes for preparing the N-chloromethylphthalimide suitable for this purpose.

Weakly-basic anion exchangers are water-insoluble polymers which contain primary and/or secondary and/or tertiary amino groups, the anion exchangers containing primary amino groups serving as starting materials for the preparation of the anion exchangers containing secondary or tertiary amino groups or containing quaternary ammonium groups.

For preparing weakly-basic anion exchangers there are two industrially mature processes: 1. the chloromethylation process with subsequent amination and 2. the aminomethylation process.

Chloromethylation comprises preparing chloromethyl-containing crosslinked vinylaromatic polymers and then reacting them with amines or polyamines, illustrated below by the example of the reaction of crosslinked polystyrene with monochlorodimethyl ether and subsequently with dimethylamine.

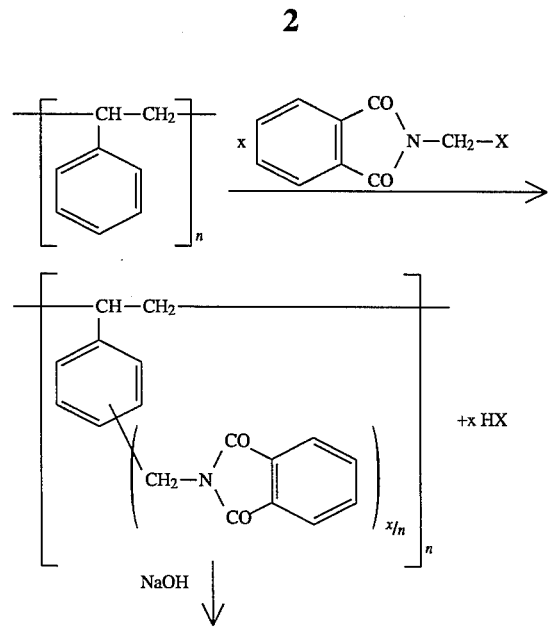

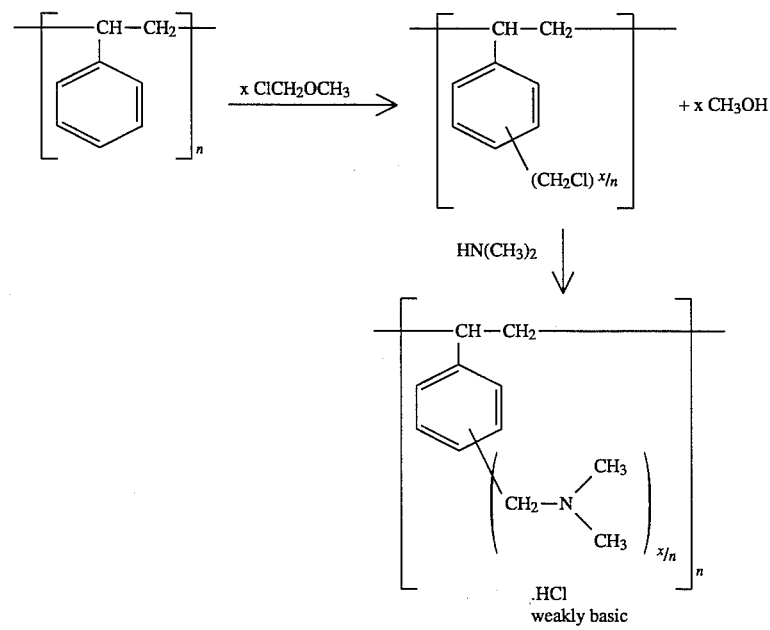

The disadvantage of this process is an unavoidable secondary reaction in which the basic nitrogen reacts with more than one halogen radical. This results in crosslinking to form quaternary structures having undesired strongly-basic ion exchanger properties (R. L. Gustarson, Ind. Eng. Chem. Fundam., Vol. 9, No. 2, 1970), the exchange capacities being reduced.

In contrast, aminomethylation comprises reacting vinylaromatic polymers with phthalimide derivatives and hydrating the resulting imides, as shown in the scheme below:

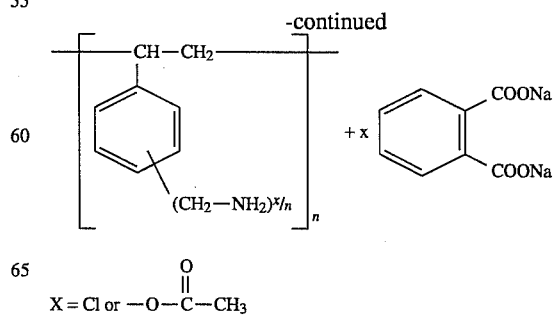

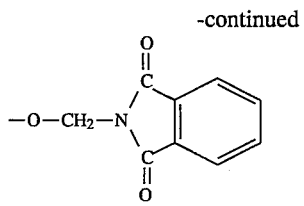

with n=from 0.3 to 1.5 applying in each case.

More stringent environmental protection requirements suggest a sensible work-up of the disodium phthalate solution. To prepare the aminomethylating reagent from this requires a number of steps: liberation of the phthalic acid from its salt, separation of the phthalic acid from the aqueous phase, anhydride formation, conversion of the phthalic anhydride to the imide and finally conversion(s) of the phthalimide to the desired aminomethylating reagent. This work-up is so complicated that there has been a strong need for an elegant process whereby by-products obtained can be worked up in a clear, short reaction sequence to one of the starting materials.

Surprisingly, this problem has been solved by a process wherein a) the crosslinked vinylaromatic polymer is reacted with N-chloromethylphthalimide, b) the reaction product obtained is cleaved with methylamine into the weakly-basic anion exchanger and into N,N'-dimethylphthalmide, c) the N,N'-dimethylphthalamide is cyclized to N-methylphthalimide and d) this is chlorinated with chlorine in the presence of free radicals to give N-chloromethylphthalimide.

The vinylaromatic polymers are crosslinked, preferably by copolymerization with crosslinking monomers having more than one, preferably having 2 or 3, copolymerizable C=C double bond(s) per molecule. Such crosslinking monomers include, for example, polyfunctional vinylaromatics such as di- and trivinylbenzenes, divinylethylbenzene, divinyltoluene, divinylxylene, divinylethylbenzene, divinylnaphthalene, polyfunctional allylaromatics such as di- and triallylbenzenes, polyfunctional vinyl and allyl heterocycles such as trivinyl and triallyl cyanurate and isocyanurate, N,N'-$C_1$-$C_6$-alkylenediacrylamides and -dimethacrylamides such as N,N'-methylenediacrylamide and -dimethacrylamide, N,N'-ethylenediacrylamide and -dimethacrylamide, polyvinyl and polyallyl ethers of saturated $C_2$-$C_{20}$-polyols having from 2 to 4 OH groups per molecule, such as, for example, ethylene glycol divinyl and diallyl ether and diethylene glycol divinyl and diallyl ether, esters of unsaturated $C_3$-$C_{12}$-alcohols or saturated $C_2$-$C_{20}$-polyols having from 2 to 4 OH groups per molecule such as allyl methacrylate, ethylene glycol di(meth)acrylate, glyceryl tri(meth)acrylate, pentaerythtirol tetra(meth) acrylate, divinylethyleneurea, divinylpropyleneurea, divinyl adipate, aliphatic and cycloaliphatic olefins having 2 or 3 isolated C=C double bonds such as 1,5-hexadiene, 2,5-dimethyl-1, 5-hexadiene, 1,7-octadiene, 1,2,4-trivinylcyclohexane. Crosslinking monomers which have proven particularly suitable are divinylbenzene (as mixture of isomers) and also mixtures of divinylbenzene and aliphatic $C_6$-$C_{12}$-hydrocarbons having 2 or 3 C=C double bonds. The crosslinking monomers are generally used in amounts from 2 to 20% by weight, preferably from 2 to 12% by weight, based on the total amount of the polymerizable monomers used.

The crosslinking monomers do not have to be used in pure form, but can also be used in the form of commercial industrial mixtures of lower purity (such as, for example, divinylbenzene in admixture with ethylstyrene).

The aminomethylation a) can be carried out by reaction of the crosslinked vinylaromatic polymer with N-chloromethylphthalimide in the presence of swelling agents for crosslinked vinylaromatic polymers and Friedel-Crafts catalysts (DE-B 1 054 715), with the phthalimide derivative being used in the amounts appropriate for the desired degree of substitution (from 0.3 to 2.0 substitutions per aromatic ring) of the aromatic rings present in the crosslinked vinylaromatic polymer (or in an excess of up to 20%, preferably up to 10%).

Suitable swelling agents include halogenated hydrocarbons, preferably chlorinated $C_1$-$C_4$-hydrocarbons. The most preferred swelling agent is 1,2-dichloroethane.

Preferred Friedel-Crafts catalysts include, for example, $AlCl_3$, $BF_3$, $FeCl_3$, $ZnCl_2$, $TiCl_4$, $ZrCl_4$, $SnCl_4$, $H_3PO_4$, HF and $HBF_4$. The catalysts can be used in amounts from 0.01 to 0.1 mol per mol of N-chloromethylphthalimide.

The reaction can be carried out, for example, by introducing the crosslinked vinylaromatic polymer into a solution of N-chloromethylphthalimide in a swelling agent and allowing the reactants to react in the presence of the catalyst at elevated temperature, in general from 50° to 100° C., preferably from 50° to 75° C., until the evolution of hydrogen chloride is essentially complete. This is generally the case after from 2 to 20 hours. After separation of substituted vinylaromatic polymer and liquid reaction medium and inorganic products it is advisable to take up the vinylaromatic polymer in aqueous sodium chloride solution and to remove the residues of swelling agent by distillation.

The cleavage b) of the substituted vinylaromatic polymer with the aid of methylamine requires at least 2, preferably at least 3, mol of methylamine per mol of phthalimidomethyl groups. The reaction temperature is preferably from 110° to 150° C., the pressure preferably from 10 to 100 bar. According to a preferred embodiment, the reaction is carried out in excess methylamine as reaction medium. The progress of the reaction can be followed analytically, for example by titration of the primary amino groups formed with dilute hydrochloric acid. The reaction is generally complete after from 2 to 20 hours. After drawing off the excess methylamine, the N,N'-dimethylphthalamide formed can be taken up in a suitable organic solvent and separated from the weakly-basic anion exchanger. Suitable solvents are, for example, organic liquids having boiling points between 40° and 130° C.; preferred solvents are aliphatic monohydric $C_1$-$C_4$-alcohols such as methanol, ethanol, isopropanol and the various butanols.

It is advisable to draw off the solvent before the dimethylphthalamide is used in the reaction c). The reaction c) is known in principle; cf. Spring, Woods, J. Chem. Soc. 1945, 625–628. The reaction can be carried out either thermally or in the presence of water. The thermal cyclization is preferably carried out at temperatures of from 100° to 250° C., in particular from 150° to 220° C. The reaction can be carried out in an organic solvent; preferably the reaction is carried out in the melt with the eliminated methylamine being distilled off. The reaction can be regarded as complete as soon as the evolution of methylamine has ended. The residue can be purified, for example by recrystallization or sublimation.

The chlorination d) of the N-methylphthalimide is carried out using at least equimolar amounts of chlorine; preferably a chlorine excess of up to 20% is used. The reaction is accelerated by the presence of free-radical formers. Suitable examples of such compounds are diacyl peroxides such as diacetyl peroxide, dibenzoyl peroxide, di-p-chlorobenzoyl peroxide, peroxy esters such as tert.-butyl peroxyacetate, tert.-butyl peroxybenzoate, dicyclohexyl peroxydicarbonate, alkyl peroxides such as bis(tert.-butylperoxybutane), dicumyl peroxide, tert.-butyl cumyl peroxide, hydroperoxides such as cumene hydroperoxide, tert.-butyl hydroperoxide, ketone peroxides such as cyclohexanone hydroperoxide, methyl ethyl ketone hydroperoxide, acetylacetone peroxide or preferably azobis(isobutyronitrile).

The free-radical formers can be used in catalytic amounts, i.e. preferably from 0.01 to 2% by weight, based on N-methylphthalimide.

The reaction d) is preferably carried out at elevated temperature, in general at from 45° to 180° C. It is possible to carry out the reaction in an organic solvent; preferably the reaction is carried out in the melt. The reaction is complete as soon as no more chlorine is taken up; this is generally the case after from 2 to 8 hours. The N-chloromethylphthalimide formed can be used without further purification in the reaction step a).

The whole reaction scheme is illustrated below for the example of a polystyrene:

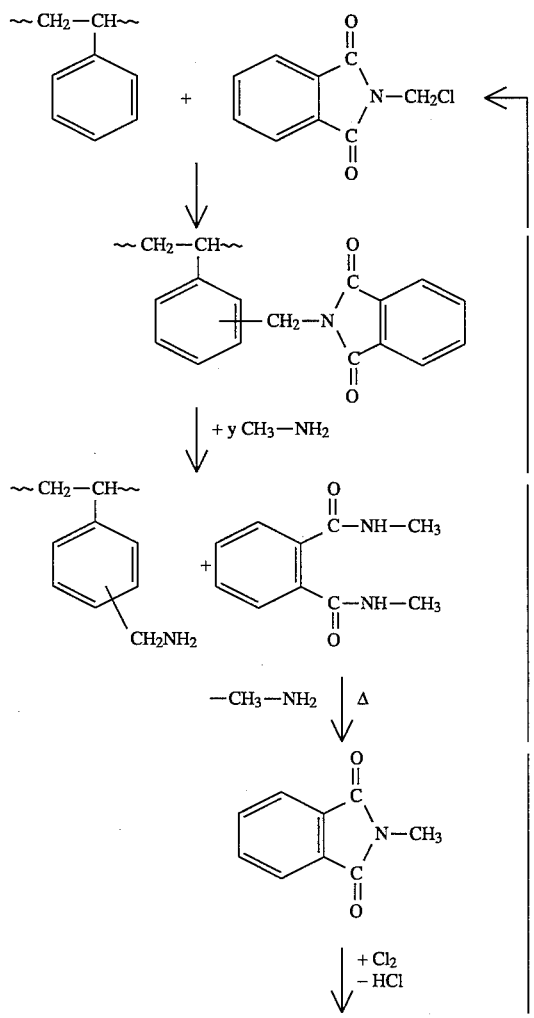

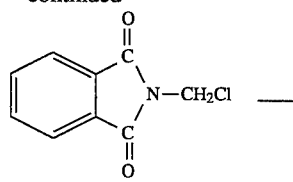

The invention accordingly provides a process for preparing weakly-basic anion exchangers based on crosslinked vinylaromatic polymers containing ring-bonded primary aminomethyl groups by reaction of (i) crosslinked vinylaromatic polymers containing ring-bonded phthalimidomethyl groups with (ii) methylamine at elevated temperature under pressure.

The invention further provides a process for preparing N-chloromethylphthalimide by chlorination of N-methylphthalimide with chlorine in the presence of free-radical formers at elevated temperature.

Finally, the invention further provides a process for preparing weakly-basic anion exchangers based on crosslinked vinylaromatic polymers containing ring-bonded primary aminomethyl groups, wherein a) crosslinked vinylaromatic polymer is reacted with N-chloromethylphthalimide b) the reaction product obtained is cleaved with methylamine into anion exchangers and N,N'-dimethylphthalamide, c) the N,N'-dimethylphthalamide obtained is cyclized to N-methylphthalimide and d) this is chlorinated with chlorine in the presence of free-radical formers.

The weakly-basic anion exchangers obtainable by the process of the invention contain $-CH_2-NH_2$ groups; they can be used as such for ion exchange or be reacted with alkylating agents, such as methyl chloride, or with formaldehyde/formic acid (Leuckart-Wallach) to give the quaternary ammonium salts or the tertiary amines, with the tertiary amines, if desired, being reacted with alkylating agents such as chloroethanol to give quaternary ammonium salts.

Weakly-basic anion exchangers containing $-CH_2NH_2$ groups can be further reacted with the sodium salt of monochloroacetic acid to give chelate resins of the aminodiacetic acid type or with thiourea to give resins having thiourea functions or with HCHO/phosphorus(III) to give resins having aminomethylphosphonic acid groups.

The invention further provides for the use of the anion exchangers containing $-CH_2-NH_2$ groups and obtainable according to the invention for the preparation of resins containing tertiary aminomethyl groups and/or quaternary ammonium groups and/or iminodiacetic acid groups. These resins can be used as anion exchangers or as adsorber resins.

EXAMPLES

Reaction a)

97 g of N-chloromethylphthalimide (0.5 mol) are introduced at room temperature into 600 ml of 1,2-dichloroethane and dissolved. 60 g (0.57 mol) of a crosslinked bead polymer based on styrene/divinylbenzene having a divinylbenzene content of 4% by weight are then added. The suspension is stirred for one hour at room temperature. 0.05 mol of tin tetrachloride are then metered in over 30 minutes, the mixture is heated to reflux temperature and is stirred for a further 10 hours at this temperature.

After cooling, the reaction liquid is drawn off. Aqueous NaCl solution is added and residues of 1,2-dichloroethane are distilled off.

Reaction b)

In a 1.3 l autoclave, 100 g of the dried resin from reaction a) were stirred in 400 ml of methylamine at 120° C. for 8 hours (p=37–38 bar). After cooling to room temperature, the methylamine was slowly transferred to a second autoclave (residual pressure: 4.5 bar), with simultaneous decompression. Subsequently the resin was reacted again with 400 ml of methylamine for 8 hours at 120° C., and the above described procedure was followed. The residue remaining after evaporation of the methylamine was dried at 80° C. to remove residual amounts of methylamine.

Weight of N,N'-dimethylphthalamide obtained after 1st reaction: 55.7 g (84% of theory)

Weight of N,N'-dimethylphthalamide obtained after 2nd reaction: 11.6 g

Total amount of N,N'-dimethylphthalamide: 67.3 g (100% of theory)

Weight of anion exchanger obtained: 54.5 g (99.2% of theory)

Total capacity: 3.0 mol/l

Substitution: 0.77 per aromatic ring

The weakly-basic anion exchanger obtained was reacted with methyl chloride to give the strongly-basic anion exchanger. Total capacity: 1.26 mol/l.

Reaction c)

19.7 g of N,N'-dimethylphthalamide are charged into a 100 ml three-necked flask and heated to 183° C. The mixture is maintained at this temperature for 21 hours. Methylamine distills off while heating up.

After cooling there remains in the flask a brown residue which after sublimation is obtained as a white solid.

According to HPLC, this solid has the following composition:

9.1% by weight of N,N'-dimethylphthalamide,
1.1% by weight of 4-methylbenzylamine,
89.8% by weight of N-methylphthalimide.

Reaction d)

322 g (2 mol) of N-methylphthalimide were melted at 170° C. in a 0.5 l four-necked flask fitted with stirrer, thermometer, reflux condenser and gas inlet tube. At an internal temperature of from 150° to 155° C., 160 g (2.2 mol) of chlorine and 1 g of azobis(isobutyronitrile) (as 5% strength by weight solution in dichloromethane) were added over a period of 4.5 hours. The hot melt was poured onto aluminium foil and solidified.

Yield: 370 g containing 346 g of N-chloromethylphthalimide corresponding to 88.5% of theory.

We claim:

1. Process for preparing a weakly-basic anion exchanger based on a crosslinked vinylaromatic polymer containing ring-bonded primary aminomethyl groups, comprising
   a) reacting a crosslinked vinylaromatic polymer with N-chloromethylphthalimide,
   b) cleaving the reaction product so obtained with methylamine at an elevated temperature under pressure thereby to form an anion exchanger and N,N'-dimethylphthalamide,
   c) cyclizing the N,N'-dimethylphthalamide to N-methylphthalimide, and
   d) reacting the N-methylphthalimide with chlorine at elevated temperature in the presence of a free radical former selected from the group consisting of a peroxide, hydroperoxide and azo compound.

2. In the preparation of an anion exchanger containing at least one of secondary or tertiary aminomethyl groups and/or quaternary ammonium groups by reaction of a —CH$_2$—NH$_2$—group-containing anion exchanger with at least one of an alkylating agent or formaldehyde/formic acid, the improvement which comprises utilizing as the —CH$_2$NH$_2$—group-containing anion exchanger an exchanger produced by the process of claim 1.

* * * * *